United States Patent
Chaji

(10) Patent No.: US 9,134,825 B2
(45) Date of Patent: Sep. 15, 2015

(54) SYSTEMS AND METHODS FOR DISPLAY SYSTEMS WITH DYNAMIC POWER CONTROL

(75) Inventor: Gholamreza Chaji, Waterloo (CA)

(73) Assignee: Ignis Innovation Inc., Waterloo, Ontario (CA)

( * ) Notice: Subject to any disclaimer, the term of this patent is extended or adjusted under 35 U.S.C. 154(b) by 272 days.

(21) Appl. No.: 13/474,131

(22) Filed: May 17, 2012

(65) Prior Publication Data
US 2012/0293481 A1    Nov. 22, 2012

Related U.S. Application Data

(60) Provisional application No. 61/487,272, filed on May 17, 2011.

(51) Int. Cl.
| G06F 3/038 | (2013.01) |
| G09G 5/00 | (2006.01) |
| G06F 1/32 | (2006.01) |
| G09G 3/32 | (2006.01) |

(52) U.S. Cl.
CPC .............. *G06F 3/038* (2013.01); *G06F 1/3218* (2013.01); *G06F 1/3265* (2013.01); *G09G 3/3225* (2013.01); *G09G 2300/0866* (2013.01); *G09G 2320/043* (2013.01); *G09G 2320/045* (2013.01); *G09G 2320/048* (2013.01); *G09G 2320/0613* (2013.01); *G09G 2320/0626* (2013.01); *G09G 2330/021* (2013.01); *G09G 2330/022* (2013.01); *Y02B 60/1242* (2013.01); *Y02B 60/32* (2013.01)

(58) Field of Classification Search
CPC .................................................. G06F 1/3296
See application file for complete search history.

(56) References Cited

U.S. PATENT DOCUMENTS

| 4,354,162 A | 10/1982 | Wright |
| 4,758,831 A | 7/1988 | Kasahara et al. |

(Continued)

FOREIGN PATENT DOCUMENTS

| CA | 1294034 | 1/1992 |
| CA | 2109951 | 11/1992 |

(Continued)

OTHER PUBLICATIONS

Shin et al.: "Dynamic Voltage Scaling of OLED Displays;" 48th Design Automation Conference, San Diego, California, dated Jun. 5-10, 2011, pp. 53-58 (6 pages). http://atrak.usc.edu/~massoud/Papers/OLED-DVS-dac !!.pdf.

(Continued)

*Primary Examiner* — Kenneth B Lee, Jr.
(74) *Attorney, Agent, or Firm* — Nixon Peabody LLP

(57) ABSTRACT

Methods and systems to dynamically adjust a voltage supply of a display are provided. Systems are provided to receive a digital data input indicative of an amount of luminance to be emitted from the display, to determine a desired supply voltage to supply to the display based on the received digital data, and to adjust an adjustable voltage supply according to the determined desired supply voltage. Furthermore, the methods and systems disclosed herein provide for dynamically separately controlling supply voltages supplied to distinct subsections of the display. Systems and methods are also provided for operating a display device in an idle mode by turning off subsections of the display that would otherwise be shown dark and thereby save energy required to program the subsections with display information.

16 Claims, 10 Drawing Sheets

(56) References Cited

U.S. PATENT DOCUMENTS

| | | |
|---|---|---|
| 4,963,860 A | 10/1990 | Stewart |
| 4,975,691 A | 12/1990 | Lee |
| 4,996,523 A | 2/1991 | Bell et al. |
| 5,051,739 A | 9/1991 | Hayashida et al. |
| 5,222,082 A | 6/1993 | Plus |
| 5,266,515 A | 11/1993 | Robb et al. |
| 5,498,880 A | 3/1996 | Lee et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,686,935 A | 11/1997 | Weisbrod |
| 5,712,653 A | 1/1998 | Katoh et al. |
| 5,714,968 A | 2/1998 | Ikeda |
| 5,747,928 A | 5/1998 | Shanks et al. |
| 5,748,160 A | 5/1998 | Shieh et al. |
| 5,784,042 A | 7/1998 | Ono et al. |
| 5,790,234 A | 8/1998 | Matsuyama |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,952,789 A | 9/1999 | Stewart et al. |
| 5,990,629 A | 11/1999 | Yamada et al. |
| 6,023,259 A | 2/2000 | Howard et al. |
| 6,069,365 A | 5/2000 | Chow et al. |
| 6,081,131 A | 6/2000 | Ishii |
| 6,091,203 A | 7/2000 | Kawashima et al. |
| 6,097,360 A | 8/2000 | Holloman |
| 6,144,222 A | 11/2000 | Ho |
| 6,157,583 A | 12/2000 | Starnes et al. |
| 6,166,489 A | 12/2000 | Thompson et al. |
| 6,177,915 B1 | 1/2001 | Beeteson et al. |
| 6,225,846 B1 | 5/2001 | Wada et al. |
| 6,229,508 B1 | 5/2001 | Kane |
| 6,232,939 B1 | 5/2001 | Saito et al. |
| 6,246,180 B1 | 6/2001 | Nishigaki |
| 6,252,248 B1 | 6/2001 | Sano et al. |
| 6,259,424 B1 | 7/2001 | Kurogane |
| 6,274,887 B1 | 8/2001 | Yamazaki et al. |
| 6,288,696 B1 | 9/2001 | Holloman |
| 6,300,928 B1 | 10/2001 | Kim |
| 6,303,963 B1 | 10/2001 | Ohtani et al. |
| 6,306,694 B1 | 10/2001 | Yamazaki et al. |
| 6,307,322 B1 | 10/2001 | Dawson et al. |
| 6,316,786 B1 | 11/2001 | Mueller et al. |
| 6,320,325 B1 | 11/2001 | Cok et al. |
| 6,323,631 B1 | 11/2001 | Juang |
| 6,323,832 B1 | 11/2001 | Nishizawa et al. |
| 6,345,085 B1 | 2/2002 | Yeo et al. |
| 6,348,835 B1 | 2/2002 | Sato et al. |
| 6,365,917 B1 | 4/2002 | Yamazaki |
| 6,373,453 B1 | 4/2002 | Yudasaka |
| 6,384,427 B1 | 5/2002 | Yamazaki et al. |
| 6,392,617 B1 | 5/2002 | Gleason |
| 6,399,988 B1 | 6/2002 | Yamazaki |
| 6,414,661 B1 | 7/2002 | Shen et al. |
| 6,420,758 B1 | 7/2002 | Nakajima |
| 6,420,834 B2 | 7/2002 | Yamazaki et al. |
| 6,420,988 B1 | 7/2002 | Azami et al. |
| 6,433,488 B1 | 8/2002 | Bu |
| 6,445,376 B2 | 9/2002 | Parrish |
| 6,468,638 B2 | 10/2002 | Jacobsen et al. |
| 6,489,952 B1 | 12/2002 | Tanaka et al. |
| 6,501,098 B2 | 12/2002 | Yamazaki |
| 6,501,466 B1 | 12/2002 | Yamagashi et al. |
| 6,512,271 B1 | 1/2003 | Yamazaki et al. |
| 6,518,594 B1 | 2/2003 | Nakajima et al. |
| 6,524,895 B2 | 2/2003 | Yamazaki et al. |
| 6,531,713 B1 | 3/2003 | Yamazaki |
| 6,559,594 B2 | 5/2003 | Fukunaga et al. |
| 6,573,195 B1 | 6/2003 | Yamazaki et al. |
| 6,573,584 B1 | 6/2003 | Nagakari et al. |
| 6,576,926 B1 | 6/2003 | Yamazaki et al. |
| 6,580,408 B1 | 6/2003 | Bae et al. |
| 6,580,657 B2 | 6/2003 | Sanford et al. |
| 6,583,775 B1 | 6/2003 | Sekiya et al. |
| 6,583,776 B2 | 6/2003 | Yamazaki et al. |
| 6,587,086 B1 | 7/2003 | Koyama |
| 6,593,691 B2 | 7/2003 | Nishi et al. |
| 6,594,606 B2 | 7/2003 | Everitt |
| 6,597,203 B2 | 7/2003 | Forbes |
| 6,611,108 B2 | 8/2003 | Kimura |
| 6,617,644 B1 | 9/2003 | Yamazaki et al. |
| 6,618,030 B2 | 9/2003 | Kane et al. |
| 6,641,933 B1 | 11/2003 | Yamazaki et al. |
| 6,661,180 B2 | 12/2003 | Koyama |
| 6,661,397 B2 | 12/2003 | Mikami et al. |
| 6,670,637 B2 | 12/2003 | Yamazaki et al. |
| 6,677,713 B1 | 1/2004 | Sung |
| 6,680,577 B1 | 1/2004 | Inukai et al. |
| 6,687,266 B1 | 2/2004 | Ma et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,734,636 B2 | 5/2004 | Sanford et al. |
| 6,738,034 B2 | 5/2004 | Kaneko et al. |
| 6,738,035 B1 | 5/2004 | Fan |
| 6,771,028 B1 | 8/2004 | Winters |
| 6,777,712 B2 | 8/2004 | Sanford et al. |
| 6,780,687 B2 | 8/2004 | Nakajima et al. |
| 6,806,638 B2 | 10/2004 | Lih et al. |
| 6,806,857 B2 | 10/2004 | Sempel et al. |
| 6,809,706 B2 | 10/2004 | Shimoda |
| 6,859,193 B1 | 2/2005 | Yumoto |
| 6,861,670 B1 | 3/2005 | Ohtani et al. |
| 6,873,117 B2 | 3/2005 | Ishizuka |
| 6,873,320 B2 | 3/2005 | Nakamura |
| 6,878,968 B1 | 4/2005 | Ohnuma |
| 6,909,114 B1 | 6/2005 | Yamazaki |
| 6,909,419 B2 | 6/2005 | Zavracky et al. |
| 6,919,871 B2 | 7/2005 | Kwon |
| 6,937,215 B2 | 8/2005 | Lo |
| 6,940,214 B1 | 9/2005 | Komiya et al. |
| 6,943,500 B2 | 9/2005 | LeChevalier |
| 6,954,194 B2 | 10/2005 | Matsumoto et al. |
| 6,956,547 B2 | 10/2005 | Bae et al. |
| 6,995,510 B2 | 2/2006 | Murakami et al. |
| 6,995,519 B2 | 2/2006 | Arnold et al. |
| 7,022,556 B1 | 4/2006 | Adachi |
| 7,023,408 B2 | 4/2006 | Chen et al. |
| 7,027,015 B2 | 4/2006 | Booth, Jr. et al. |
| 7,034,793 B2 | 4/2006 | Sekiya et al. |
| 7,088,051 B1 | 8/2006 | Cok |
| 7,106,285 B2 | 9/2006 | Naugler |
| 7,116,058 B2 | 10/2006 | Lo et al. |
| 7,129,914 B2 | 10/2006 | Knapp et al. |
| 7,129,917 B2 | 10/2006 | Yamazaki et al. |
| 7,141,821 B1 | 11/2006 | Yamazaki et al. |
| 7,193,589 B2 | 3/2007 | Yoshida et al. |
| 7,199,516 B2 | 4/2007 | Seo et al. |
| 7,220,997 B2 | 5/2007 | Nakata |
| 7,235,810 B1 | 6/2007 | Yamazaki et al. |
| 7,245,277 B2 | 7/2007 | Ishizuka |
| 7,248,236 B2 | 7/2007 | Nathan et al. |
| 7,264,979 B2 | 9/2007 | Yamagata et al. |
| 7,274,345 B2 | 9/2007 | Imamura et al. |
| 7,274,363 B2 | 9/2007 | Ishizuka et al. |
| 7,279,711 B1 | 10/2007 | Yamazaki et al. |
| 7,304,621 B2 | 12/2007 | Oomori et al. |
| 7,310,092 B2 | 12/2007 | Imamura |
| 7,315,295 B2 | 1/2008 | Kimura |
| 7,317,429 B2 | 1/2008 | Shirasaki et al. |
| 7,319,465 B2 | 1/2008 | Mikami et al. |
| 7,321,348 B2 | 1/2008 | Cok et al. |
| 7,339,636 B2 | 3/2008 | Voloschenko et al. |
| 7,355,574 B1 | 4/2008 | Leon et al. |
| 7,358,941 B2 | 4/2008 | Ono et al. |
| 7,402,467 B1 | 7/2008 | Kadono et al. |

(56) References Cited

U.S. PATENT DOCUMENTS

| | | |
|---|---|---|
| 7,414,600 B2 | 8/2008 | Nathan et al. |
| 7,432,885 B2 | 10/2008 | Asano et al. |
| 7,474,285 B2 | 1/2009 | Kimura |
| 7,485,478 B2 | 2/2009 | Yamagata et al. |
| 7,502,000 B2 | 3/2009 | Yuki et al. |
| 7,535,449 B2 | 5/2009 | Miyazawa |
| 7,554,512 B2 | 6/2009 | Steer |
| 7,569,849 B2 | 8/2009 | Nathan et al. |
| 7,619,594 B2 | 11/2009 | Hu |
| 7,619,597 B2 | 11/2009 | Nathan et al. |
| 7,697,052 B1 | 4/2010 | Yamazaki et al. |
| 7,825,419 B2 | 11/2010 | Yamagata et al. |
| 7,859,492 B2 | 12/2010 | Kohno |
| 7,868,859 B2 | 1/2011 | Tomida et al. |
| 7,876,294 B2 | 1/2011 | Sasaki et al. |
| 7,948,170 B2 | 5/2011 | Striakhilev et al. |
| 7,969,390 B2 | 6/2011 | Yoshida |
| 7,995,010 B2 | 8/2011 | Yamazaki et al. |
| 8,044,893 B2 | 10/2011 | Nathan et al. |
| 8,378,362 B2 | 2/2013 | Heo et al. |
| 8,493,295 B2 | 7/2013 | Yamazaki et al. |
| 8,497,525 B2 | 7/2013 | Yamagata et al. |
| 2001/0002703 A1 | 6/2001 | Koyama |
| 2001/0004190 A1 | 6/2001 | Nishi et al. |
| 2001/0013806 A1 | 8/2001 | Notani |
| 2001/0015653 A1 | 8/2001 | De Jong et al. |
| 2001/0020926 A1 | 9/2001 | Kujik |
| 2001/0026127 A1 | 10/2001 | Yoneda et al. |
| 2001/0026179 A1 | 10/2001 | Saeki |
| 2001/0026257 A1 | 10/2001 | Kimura |
| 2001/0030323 A1 | 10/2001 | Ikeda |
| 2001/0033199 A1 | 10/2001 | Aoki |
| 2001/0038098 A1 | 11/2001 | Yamazaki et al. |
| 2001/0043173 A1 | 11/2001 | Troutman |
| 2001/0045929 A1 | 11/2001 | Prache et al. |
| 2001/0052606 A1 | 12/2001 | Sempel et al. |
| 2001/0052898 A1 | 12/2001 | Osame et al. |
| 2002/0000576 A1 | 1/2002 | Inukai |
| 2002/0011796 A1 | 1/2002 | Koyama |
| 2002/0011799 A1 | 1/2002 | Kimura |
| 2002/0011981 A1 | 1/2002 | Kujik |
| 2002/0015031 A1 | 2/2002 | Fujita et al. |
| 2002/0015032 A1 | 2/2002 | Koyama et al. |
| 2002/0030528 A1 | 3/2002 | Matsumoto et al. |
| 2002/0030647 A1 | 3/2002 | Hack et al. |
| 2002/0036463 A1 | 3/2002 | Yoneda et al. |
| 2002/0047852 A1 | 4/2002 | Inukai et al. |
| 2002/0048829 A1 | 4/2002 | Yamazaki et al. |
| 2002/0050795 A1 | 5/2002 | Imura |
| 2002/0053401 A1 | 5/2002 | Ishikawa et al. |
| 2002/0070909 A1 | 6/2002 | Asano et al. |
| 2002/0080108 A1 | 6/2002 | Wang |
| 2002/0084463 A1 | 7/2002 | Sanford et al. |
| 2002/0101172 A1 | 8/2002 | Bu |
| 2002/0101433 A1 | 8/2002 | McKnight |
| 2002/0113248 A1 | 8/2002 | Yamagata et al. |
| 2002/0122308 A1 | 9/2002 | Ikeda |
| 2002/0130686 A1 | 9/2002 | Forbes |
| 2002/0154084 A1 | 10/2002 | Tanaka et al. |
| 2002/0158823 A1 | 10/2002 | Zavracky et al. |
| 2002/0163314 A1 | 11/2002 | Yamazaki et al. |
| 2002/0180369 A1 | 12/2002 | Koyama |
| 2002/0180721 A1 | 12/2002 | Kimura et al. |
| 2002/0186214 A1 | 12/2002 | Siwinski |
| 2002/0190332 A1 | 12/2002 | Lee et al. |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0062524 A1 | 4/2003 | Kimura |
| 2003/0063081 A1 | 4/2003 | Kimura et al. |
| 2003/0071804 A1 | 4/2003 | Yamazaki et al. |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0140958 A1 | 7/2003 | Yang et al. |
| 2003/0151569 A1 | 8/2003 | Lee et al. |
| 2003/0169219 A1 | 9/2003 | LeChevalier |
| 2003/0174152 A1 | 9/2003 | Noguchi |
| 2003/0179626 A1 | 9/2003 | Sanford et al. |
| 2003/0197663 A1 | 10/2003 | Lee et al. |
| 2003/0206060 A1 | 11/2003 | Suzuki |
| 2003/0230980 A1 | 12/2003 | Forrest et al. |
| 2004/0027063 A1 | 2/2004 | Nishikawa |
| 2004/0056604 A1 | 3/2004 | Shih et al. |
| 2004/0066357 A1 | 4/2004 | Kawasaki |
| 2004/0070557 A1 | 4/2004 | Asano et al. |
| 2004/0080262 A1 | 4/2004 | Park et al. |
| 2004/0080470 A1 | 4/2004 | Yamazaki et al. |
| 2004/0090400 A1 | 5/2004 | Yoo |
| 2004/0108518 A1 | 6/2004 | Jo |
| 2004/0113903 A1 | 6/2004 | Mikami et al. |
| 2004/0129933 A1 | 7/2004 | Nathan et al. |
| 2004/0130516 A1 | 7/2004 | Nathan et al. |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch |
| 2004/0183759 A1 | 9/2004 | Stevenson et al. |
| 2004/0189627 A1 | 9/2004 | Shirasaki et al. |
| 2004/0196275 A1 | 10/2004 | Hattori |
| 2004/0201554 A1 | 10/2004 | Satoh |
| 2004/0207615 A1 | 10/2004 | Yumoto |
| 2004/0239596 A1 | 12/2004 | Ono et al. |
| 2004/0252089 A1 | 12/2004 | Ono et al. |
| 2004/0257355 A1 | 12/2004 | Naugler |
| 2004/0263437 A1 | 12/2004 | Hattori |
| 2005/0007357 A1 | 1/2005 | Yamashita et al. |
| 2005/0035709 A1 | 2/2005 | Furuie et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0088085 A1 | 4/2005 | Nishikawa et al. |
| 2005/0088103 A1 | 4/2005 | Kageyama et al. |
| 2005/0110420 A1 | 5/2005 | Arnold et al. |
| 2005/0117096 A1 | 6/2005 | Voloschenko et al. |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0206590 A1 | 9/2005 | Sasaki et al. |
| 2005/0225686 A1 | 10/2005 | Brummack et al. |
| 2005/0260777 A1 | 11/2005 | Brabec et al. |
| 2005/0269959 A1 | 12/2005 | Uchino et al. |
| 2005/0269960 A1 | 12/2005 | Ono et al. |
| 2005/0285822 A1 | 12/2005 | Reddy et al. |
| 2005/0285825 A1 | 12/2005 | Eom et al. |
| 2006/0007072 A1 | 1/2006 | Choi et al. |
| 2006/0012310 A1 | 1/2006 | Chen et al. |
| 2006/0012311 A1 | 1/2006 | Ogawa |
| 2006/0027807 A1 | 2/2006 | Nathan et al. |
| 2006/0030084 A1 | 2/2006 | Young |
| 2006/0038758 A1 | 2/2006 | Routley et al. |
| 2006/0066527 A1 | 3/2006 | Chou |
| 2006/0092185 A1 | 5/2006 | Jo et al. |
| 2006/0232522 A1 | 10/2006 | Roy et al. |
| 2006/0261841 A1 | 11/2006 | Fish |
| 2006/0264143 A1 | 11/2006 | Lee et al. |
| 2006/0273997 A1 | 12/2006 | Nathan et al. |
| 2006/0284801 A1 | 12/2006 | Yoon et al. |
| 2007/0001937 A1 | 1/2007 | Park et al. |
| 2007/0001939 A1 | 1/2007 | Hashimoto et al. |

(56) References Cited

U.S. PATENT DOCUMENTS

| | | |
|---|---|---|
| 2007/0008268 A1 | 1/2007 | Park et al. |
| 2007/0008297 A1* | 1/2007 | Bassetti .................. 345/173 |
| 2007/0046195 A1 | 3/2007 | Chin et al. |
| 2007/0069998 A1 | 3/2007 | Naugler et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0080918 A1 | 4/2007 | Kawachi et al. |
| 2007/0103419 A1 | 5/2007 | Uchino et al. |
| 2007/0182671 A1 | 8/2007 | Nathan et al. |
| 2007/0273294 A1 | 11/2007 | Nagayama |
| 2007/0285359 A1 | 12/2007 | Ono |
| 2007/0296672 A1 | 12/2007 | Kim et al. |
| 2008/0042948 A1 | 2/2008 | Yamashita et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0150847 A1 | 6/2008 | Kim et al. |
| 2009/0032807 A1 | 2/2009 | Shinohara et al. |
| 2009/0051283 A1 | 2/2009 | Cok et al. |
| 2009/0160743 A1 | 6/2009 | Tomida et al. |
| 2009/0213046 A1 | 8/2009 | Nam |
| 2010/0052524 A1 | 3/2010 | Kinoshita |
| 2010/0079711 A1 | 4/2010 | Tanaka |
| 2010/0097335 A1 | 4/2010 | Jung et al. |
| 2010/0149218 A1 | 6/2010 | Betts-Lacroix |
| 2010/0149223 A1 | 6/2010 | Betts-Lacroix |
| 2010/0156279 A1 | 6/2010 | Tamura et al. |
| 2010/0328294 A1 | 12/2010 | Sasaki et al. |
| 2011/0090210 A1 | 4/2011 | Sasaki et al. |
| 2011/0180825 A1 | 7/2011 | Lee et al. |
| 2012/0212468 A1 | 8/2012 | Govil |
| 2013/0009930 A1 | 1/2013 | Cho et al. |
| 2013/0032831 A1 | 2/2013 | Chaji et al. |
| 2013/0113785 A1 | 5/2013 | Sumi |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 436 451 | 8/2002 |
| CA | 2 438 577 | 8/2002 |
| CA | 2 483 645 | 12/2003 |
| CA | 2 463 653 | 1/2004 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| CA | 2526782 | 4/2006 |
| CN | 1381032 | 11/2002 |
| DE | 20 2006 005427 | 6/2006 |
| EP | 0811866 | 12/1997 |
| EP | 0 940 796 | 9/1999 |
| EP | 1 028 471 A | 8/2000 |
| EP | 1 103 947 | 5/2001 |
| EP | 1 130 565 A1 | 9/2001 |
| EP | 1 184 833 | 3/2002 |
| EP | 1 194 013 | 4/2002 |
| EP | 1 310 939 | 5/2003 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 439 520 | 7/2004 |
| EP | 1 465 143 A | 10/2004 |
| EP | 1 467 408 | 10/2004 |
| EP | 1 517 290 | 3/2005 |
| EP | 1 521 203 A2 | 4/2005 |
| EP | 2317499 | 5/2011 |
| GB | 2 205 431 | 12/1988 |
| JP | 09 090405 | 4/1997 |
| JP | 10-153759 | 6/1998 |
| JP | 10-254410 | 9/1998 |
| JP | 11 231805 | 8/1999 |
| JP | 11-282419 | 10/1999 |
| JP | 2000/056847 | 2/2000 |
| JP | 2000-077192 | 3/2000 |
| JP | 2000-089198 | 3/2000 |
| JP | 2000-352941 | 12/2000 |
| JP | 2002-91376 | 3/2002 |
| JP | 2002-268576 | 9/2002 |
| JP | 2002-278513 | 9/2002 |
| JP | 2002-333862 | 11/2002 |
| JP | 2003-022035 | 1/2003 |
| JP | 2003-076331 | 3/2003 |
| JP | 2003-150082 | 5/2003 |
| JP | 2003-177709 | 6/2003 |
| JP | 2003-271095 | 9/2003 |
| JP | 2003-308046 | 10/2003 |
| JP | 2005-057217 | 3/2005 |
| JP | 2006-065148 | 3/2006 |
| JP | 2009-282158 | 12/2009 |
| TW | 485337 | 5/2002 |
| TW | 502233 | 9/2002 |
| TW | 538650 | 6/2003 |
| TW | 569173 | 1/2004 |
| WO | WO 94/25954 | 11/1994 |
| WO | WO 9948079 | 9/1999 |
| WO | WO 01/27910 A1 | 4/2001 |
| WO | WO 02/067327 A | 8/2002 |
| WO | WO 03/034389 A | 4/2003 |
| WO | WO 03/063124 | 7/2003 |
| WO | WO 03/077231 | 9/2003 |
| WO | WO 03/105117 | 12/2003 |
| WO | WO 2004/003877 | 1/2004 |
| WO | WO 2004/034364 | 4/2004 |
| WO | WO 2005/022498 | 3/2005 |
| WO | WO 2005/029455 | 3/2005 |
| WO | WO 2005/055185 | 6/2005 |
| WO | WO 2006/053424 | 5/2006 |
| WO | WO 2006/063448 A | 6/2006 |
| WO | WO 2006/137337 | 12/2006 |
| WO | WO 2007/003877 A | 1/2007 |
| WO | WO 2007/079572 | 7/2007 |
| WO | WO 2010/023270 | 3/2010 |

OTHER PUBLICATIONS

Chen et al.: "Fine-Grained Dynamic Voltage Scaling on OLED Display;" 17th Asia and South Pacific Design Auatomation Conference (ASPDAC), dated Jan. 30, 2012-Feb. 2, 2012, pp. 807-812 (6 pages). http://ieeexplore.ieee.org/stamp/stamp.jsp?arnumber=06165066.
International Search Report mailed Aug. 10, 2012 which issued in corresponding International Patent Application No. PCT/IB2012/052491 (5 pages).
Written Opinion mailed Aug. 10, 2012 which issued in corresponding International Patent Application No. PCT/IB2012/052491 (8 pages).
Ashtiani et al.: "AMOLED Pixel Circuit With Electronic Compensation of Luminance Degradation"; dated Mar. 2007 (4 pages).
European Search Report and Written Opinion for Application No. 08 86 5338 mailed Nov. 2, 2011 (7 pages).
European Search Report for European Application No. EP 04 78 6661 dated Mar. 9, 2009.
European Search Report for European Application No. EP 05 75 9141 dated Oct. 30, 2009.
European Search Report for European Application No. EP 05 82 1114 dated Mar. 27, 2009 (2 pages).
European Search Report for European Application No. EP 07 71 9579 dated May 20, 2009.
European Search Report mailed Mar. 26, 2012 in corresponding European Patent Application No. 10000421.7 (6 pages).
Extended European Search Report mailed Apr. 27, 2011 issued during prosecution of European patent application No. 09733076.5 (13 pages).
International Search Report for International Application No. PCT/CA02/00180 dated Jul. 31, 2002 (3 pages).

(56) References Cited

OTHER PUBLICATIONS

International Search Report for International Application No. PCT/CA2004/001741 dated Feb. 21, 2005.
International Search Report for International Application No. PCT/CA2005/001844 dated Mar. 28, 2006 (2 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2008/002307, mailed Apr. 28. 2009 (3 pages).
International Search Report for International Application No. PCT/IB2011/055135, Canadian Patent Office, dated Apr. 16, 2012 (5 pages).
International Search Report mailed Jul. 30, 2009 for International Application No. PCT/CA2009/000501 (4 pages).
Machine English translation of JP 2002-333862, 49 pages.
Nathan et al.: "Thin film imaging technology on glass and plastic" ICM 2000, Proceedings of the 12$^{th}$ International Conference on Microelectronics, (IEEE Cat. No. 00EX453), Tehran Iran; dated Oct. 31-Nov. 2, 2000, pp. 11-14, ISBN: 964-360-057-2, p. 13, col. 1, line 11-48; (4 pages).
Office Action issued in Chinese Patent Application 200910246264.4 Dated Jul. 5, 2013; 8 pages.
Patent Abstracts of Japan, vol. 1997, No. 08, Aug. 29, 1997, & JP 09 090405 A, Apr. 4, 1997 Abstract.
Patent Abstracts of Japan, vol. 1999, No. 13, Nov. 30, 1999, & JP 11 231805 A, Aug. 27, 1999 Abstract.
Patent Abstracts of Japan, vol. 2000, No. 09, Oct. 13, 2000—JP 2000 172199 A, Jun. 3, 2000, abstract.
Patent Abstracts of Japan, vol. 2002, No. 03, Apr. 3, 2002 (2004-04-04 & JP 2001 318627 A (Semiconductor EnergyLab DO LTD), Nov. 16, 2001, abstract, paragraphs '01331-01801, paragraph '01691, paragraph '01701, paragraph '01721 and figure 10.
Sanford, James L., et al., "4.2 TFT AMOLED Pixel Circuits and Driving Methods", SID 03 Digest, ISSN/0003, 2003, pp. 10-13.
Tatsuya Sasaoka et al., 24.4L; Late-News Paper: A 13.0-inch AM-Oled Display with Top Emitting Structure and Adaptive Current Mode Programmed Pixel Circuit (TAC), SID 01 Digest, (2001), pp. 384-387.
Written Opinion mailed Jul. 30, 2009 for International Application No. PCT/CA2009/000501 (6 pages).
Zhiguo Meng et al; "24.3: Active-Matrix Organic Light-Emitting Diode Display implemented Using Metal-Induced Unilaterally Crystallized Polycrystalline Silicon Thin-Film Transistors", SID 01Digest, (2001), pp. 380-383.
International Search Report for Application No. PCT/IB2014/059409, Canadian Intellectual Property Office, dated Jun. 12, 2014 (4 pages).
Written Opinion for Application No. PCT/IB2014/059409, Canadian Intellectual Property Office, dated Jun. 12, 2014 (5 pages).
Ahnood et al.: "Effect of threshold voltage instability on field effect mobility in thin film transistors deduced from constant current measurements"; dated Aug. 2009.
Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Arokia Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-µA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
International Searching Authority Search Report, PCT/IB2010/055481, dated Apr. 7, 2011, 2 pages.
International Searching Authority Written Opinion, PCT/IB2010/055481, dated Apr. 7, 2011, 6 pages.
Jafarabadiashtiani et al.: "A New Driving Method for a-Si AMOLED Displays Based on Voltage Feedback"; dated 2005 (4 pages).
Joon-Chul Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
Lee et al.: "Ambipolar Thin-Film Transistors Fabricated by PECVD Nanocrystalline Silicon"; dated 2006 (6 pages).
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.

(56) References Cited

OTHER PUBLICATIONS

Nathan A. et al., "Thin Film imaging technology on glass and plastic" ICM 2000, proceedings of the 12 international conference on microelectronics, dated Oct. 31, 2001 (4 pages).

Nathan et al.: "Backplane Requirements for Active Matrix Organic Light Emitting Diode Displays"; dated 2006 (16 pages).

Nathan et al.: "Call for papers second international workshop on compact thin-film transistor (TFT) modeling for circuit simulation"; dated Sep. 2009 (1 page).

Nathan et al.: "Driving schemes for a-Si and LTPS AMOLED displays"; dated Dec. 2005 (11 pages).

Nathan et al.: "Invited Paper: a -Si for AMOLED—Meeting the Performance and Cost Demands of Display Applications (Cell Phone to HDTV)", dated 2006 (4 pages).

Philipp: "Charge transfer sensing" Sensor Review, vol. 19, No. 2, Dec. 31, 1999, 10 pages.

Rafati et al.: "Comparison of a 17 b multiplier in Dual-rail domino and in Dual-rail D L (D L) logic styles"; dated 2002 (4 pages).

Safavaian et al.: "Three-TFT image sensor for real-time digital X-ray imaging"; dated Feb. 2, 2006 (2 pages).

Safavian et al.: "3-TFT active pixel sensor with correlated double sampling readout circuit for real-time medical x-ray imaging"; dated Jun. 2006 (4 pages).

Safavian et al.: "A novel current scaling active pixel sensor with correlated double sampling readout circuit for real time medical x-ray imaging"; dated May 2007 (7 pages).

Safavian et al.: "A novel hybrid active-passive pixel with correlated double sampling CMOS readout circuit for medical x-ray imaging"; dated May 2008 (4 pages).

Safavian et al.: "Self-compensated a-Si:H detector with current-mode readout circuit for digital X-ray fluoroscopy"; dated Aug. 2005 (4 pages).

Safavian et al.: "TFT active image sensor with current-mode readout circuit for digital x-ray fluoroscopy [5969D-82]"; dated Sep. 2005 (9 pages).

Stewart M. et al., "polysilicon TFT technology for active matrix oled displays" IEEE transactions on electron devices, vol. 48, No. 5, dated May 2001 (7 pages).

Vygranenko et al.: "Stability of indium-oxide thin-film transistors by reactive ion beam assisted deposition"; dated 2009.

Wang et al.: "Indium oxides by reactive ion beam assisted evaporation: From material study to device application"; dated Mar. 2009 (6 pages).

Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.

Supplementary Partial European Search Report, Application No. EP12785333, dated Nov. 5, 2014, 8 page.

\* cited by examiner

SYSTEMS AND METHODS FOR DISPLAY SYSTEMS WITH DYNAMIC POWER CONTROL

CROSS REFERENCE TO RELATED APPLICATIONS

This application claims priority to U.S. Provisional Patent Application No. 61/487,272, filed May 17, 2011, the contents of which is incorporated entirely herein by reference.

FIELD OF THE INVENTION

The present invention generally relates to emissive displays, and particularly to displays incorporating a dynamically adjustable power supply adjusting a supply voltage based on the luminance of the display.

BACKGROUND

Currently, active matrix organic light emitting device ("AMOLED") displays are being introduced. The advantages of such displays include lower power consumption, manufacturing flexibility and faster refresh rate over conventional liquid crystal displays. In contrast to conventional liquid crystal displays, there is no backlighting in an AMOLED display as each pixel consists of different colored OLEDs emitting light independently. Because no backlight is required, an AMOLED display generally consumes less power than a backlight display The OLEDs emit light based on current supplied through a drive transistor. The drive transistor is typically a thin film transistor (TFT), and the current level through the drive transistor is dependent on a voltage applied to the gate terminal of the drive transistor. Some displays include capacitors within each pixel to be charged according to programming information and then apply the stored charge to the drive transistor to control its current level. The power consumed in each pixel at any instant is related to the current through the pixel and the voltage across the pixel.

SUMMARY

Some embodiments of the present disclosure provide a system for driving a display. The system can include a first plurality of pixel circuits, a first plurality of supply lines, an adjustable voltage supply, and a controller. The first plurality of pixel circuits can be arranged in an array, and each of the first plurality of pixel circuits can include a light emitting device and a driving transistor for conveying a driving current through the light emitting device. Each of the first plurality of supply lines can be associated with one or more of the first plurality of pixel circuits. The first plurality of supply lines can provide driving currents to the one or more of the first plurality of pixel circuits associated therewith. The adjustable voltage supply can be configured to provide a supply voltage to at least one of the first plurality of supply lines. The controller can be for determining, based on digital data indicative of an amount of luminance to be emitted from the first plurality of pixel circuits, an output level from the adjustable voltage supply to apply to the at least one of the first plurality of supply lines. The output level can be sufficient to enable the one or more of the first plurality of pixel circuits associated with the at least one of the first plurality of supply lines to emit light according to the digital data.

Some embodiments of the present disclosure provide a method of operating a display. The method can include receiving digital data input; determining, based on the input, one of a plurality of supply voltages to apply to the first plurality of pixels; and adjusting a voltage of one or more supply voltage lines. The received digital data input can be indicative of an amount of luminance to be emitted from a first plurality of pixels in the display. The one or more supply voltage lines can be associated with the first plurality of pixels, and can be adjusted according to the determined one of the plurality of supply voltages.

Some embodiments of the present disclosure provide a method of operating a display. The method can include turning off a voltage supply line associated with a first portion of the display during an idle mode of the display while the first portion is set to a dark setting; and ceasing programming of the first portion of the display.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1A:
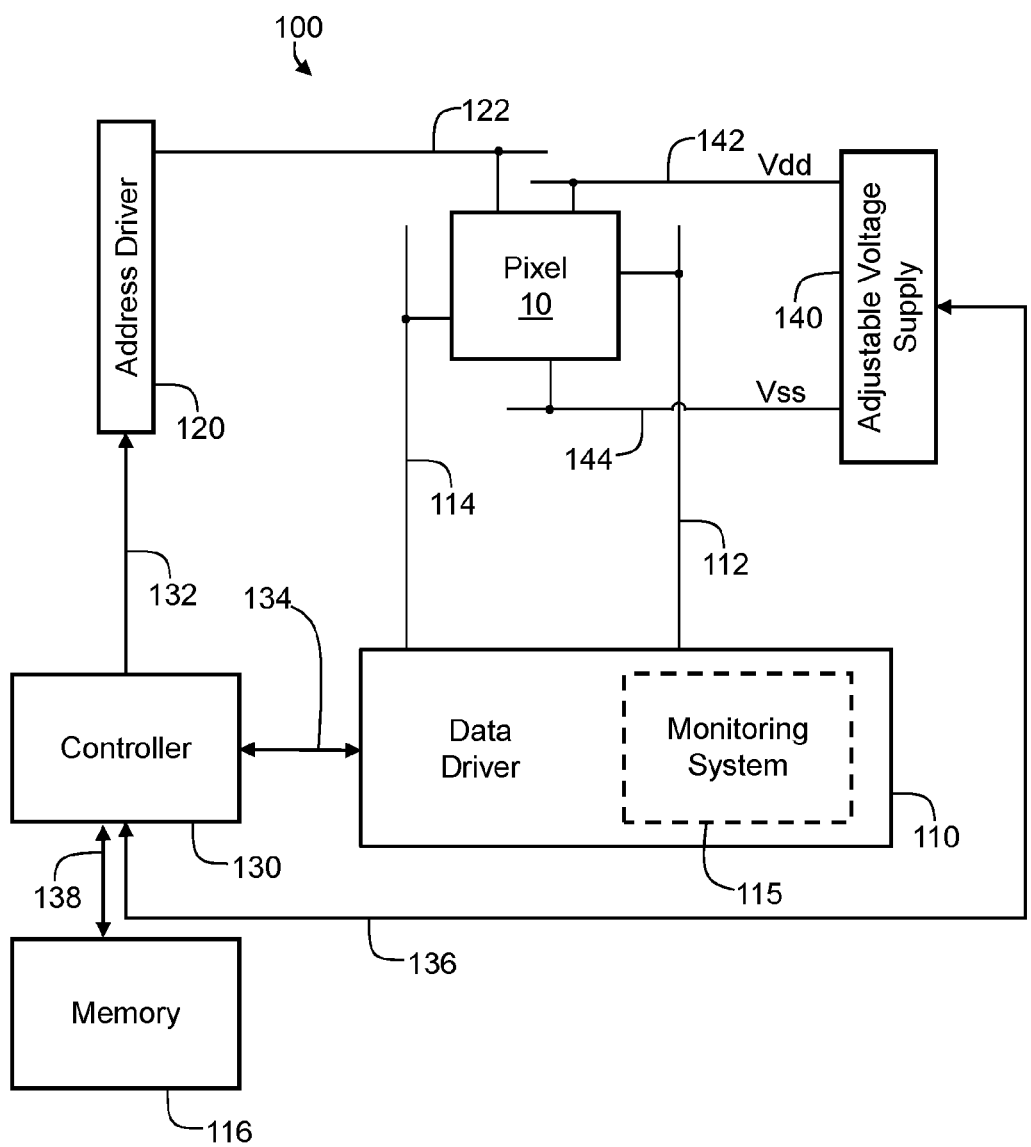
FIG. 1A is a diagram of a display system incorporating an adjustable voltage supply.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1A is a block diagram of an exemplary display system 100 incorporating an adjustable voltage supply 140. The display system 100 includes an address driver 120, a data driver 110, and a controller 130. The controller 130 receives digital data indicative of information to be displayed via the display system 100. The controller 130 sends data signals 134 to the data driver 110, scheduling signals 132 to the address driver 120, and control signals 136 to the adjustable voltage supply 140 to drive a display array to display the information indicated. The display system 100 generally includes a display array with an array of pixels, such as the pixel 10, arranged in rows in columns. The display array can include conductive and/or semi-conductive elements formed (e.g., by a deposition process) on a display substrate, an encapsulation substrate (e.g., glass), or a combination of substrates. Each of the pixels (e.g., the pixel 10) is individually programmable to emit light with individually programmable luminance values. The array of pixels thus comprise the display array ("display screen") adapted to dynamically display information according to the digital display data input to the controller 130. The display screen can display, for example, video information from a stream of video data received by the controller 130.

For illustrative purposes, the display system 100 in FIG. 1A is illustrated with a single pixel 10. It is understood that the display system 100 can be implemented with a display screen that includes an array of similar pixels, such as the pixel 10, and that the display screen is not limited to a particular number of rows and columns of pixels. For example, the display system 100 can be implemented with a display array with a number of rows and columns of pixels commonly available in displays for mobile devices, television displays, computer monitors, heads up displays, etc.

The pixel 10 is operated by a driving circuit ("pixel circuit") that includes a driving transistor and a light emitting device. Hereinafter the pixel 10 may refer to the pixel circuit. The light emitting device can optionally be an organic light emitting diode, but implementations of the present disclosure apply to pixel circuits having other electroluminescence devices, including current-driven light emitting devices. The driving transistor in the pixel 10 can optionally be an n-type or p-type thin-film transistor, but implementations of the present disclosure are not limited to pixel circuits having a particular polarity of transistor or only to pixel circuits having thin-film transistors.

The pixel 10 is coupled to a select line 122, a first supply line 142, a second supply line 144, a data line 114, and a monitor line 112. The select line 122 is provided by the address driver 120, and can be utilized to enable, for example, a programming operation of the pixel 10 by activating a switch or transistor to allow the data line 114 to program the pixel 10. The data line 114 conveys programming information from the data driver 110 to the pixel 10. For example, the data line 114 can be utilized to apply a programming voltage or a programming current to the pixel 10. The programming voltage/current can be at a level sufficient to charge a capacitor within the pixel 10 such that the drive transistor is operated to convey current through the light emitting device to emit light with a desired amount of luminance. The programming voltage (or programming current) supplied by the data driver 110 via the data line 114 is generally related to the digital data received by the controller 130 by a relationship expressed as a formula and/or by a lookup table that maps digital data values to programming voltage/current levels.

The programming voltage/current can be applied to the pixel 10 during a programming operation of the pixel 10 so as to charge a storage device within the pixel 10, such as a capacitor. Following the programming operation, the pixel 10 can emit light with the desired amount of luminance during an emission operation. For example, the storage device in the pixel 10 can be charged during a programming operation to apply a voltage to one or more of a gate and/or source terminal of the drive transistor during the emission operation. By applying the charge ("voltage") on the capacitor to the gate and/or source of the drive transistor, the conductance of the drive transistor is adjusted according to the current-voltage characteristics of the drive transistor, and a current is conveyed through the light emitting device according to the voltage stored on the capacitor.

Generally, in the pixel 10, the driving current that is conveyed through the light emitting device by the driving transistor during the emission operation of the pixel 10 is a current that is supplied by the first supply line 142 and is drained to the second supply line 144. The first supply line 142 and the second supply line 144 are coupled to the adjustable voltage supply 140. The first supply line 142 can provide a positive supply voltage (e.g., the voltage commonly referred to in circuit design as "Vdd") and the second supply line 144 can provide a negative supply voltage (e.g., the voltage commonly referred to in circuit design as "Vss"). In some embodiments of the present disclosure, one or the other of the supply lines 142, 144 are fixed at a ground voltage or at another reference voltage, and need not be connected to the adjustable voltage supply.

In some embodiments of the present disclosure, either the first supply line 142, or the second supply line 144, or both are adjustable by the adjustable voltage supply 140 according to the control signals 136 from the controller 130. For example, the value of the positive supply voltage Vdd and/or the value of the negative supply voltage Vss can be adjusted by the adjustable voltage supply 140. The difference between the voltages on the first supply line 142 and the second supply line 144 influences the amount of power drawn by the pixel 10 during the programming operation of the pixel 10. Generally, the power required by the pixel 10 during the emission phase of the pixel 10 is proportional to (Vdd−Vss)×Idrive, where Idrive is the driving current conveyed through the driving transistor, and through the light emitting device, as previously described. Thus, by reducing the difference between Vdd and Vss, the power required to drive the pixel 10 can be reduced. The difference between Vdd and Vss ("ΔV") supplied to the pixel 10 can be controlled (e.g., reduced) by adjusting the voltage on the first supply line 142 and/or the second supply line 144.

Figure 1B:
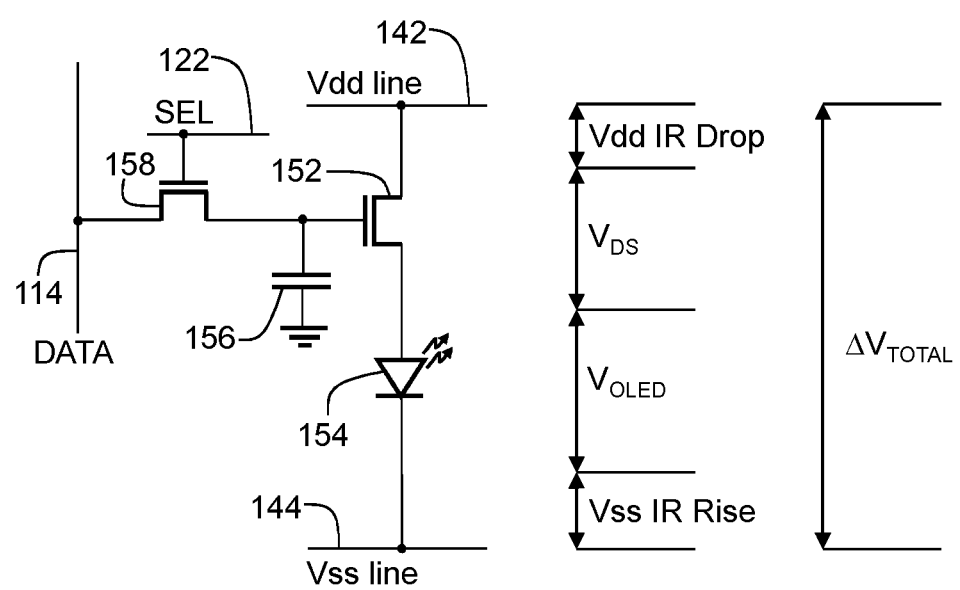
FIG. 1B is a circuit diagram of an exemplary pixel circuit showing voltage levels across the drive transistor and the light emitting device.

FIG. 1B is a circuit diagram of an exemplary pixel circuit showing voltage levels across a drive transistor 152 and a light emitting device 154. The pixel circuit in FIG. 1B is provided for illustrative purposes only to illustrate the series connection between the drive transistor 152, the light emitting device 154 between the two voltage supply lines 142, 144. Generally, the pixel circuit 10 shown in FIG. 1A can include an n-type or p-type drive transistor, and an arrangement of additional transistors and/or capacitors arranged to selectively connect to the data line 114 for programming the pixel circuit 10 according to voltage programming and/or current programming information and charging one or more capacitors within the pixel circuit to influence the conductance of a drive transistor.

In the exemplary arrangement shown in FIG. 1B, the drive transistor 152 is connected in series between the high voltage supply line 142 ("Vdd line") and the light emitting device 154. For example, the drive transistor 152 can have a drain and source and the drain of the drive transistor 152 can be connected to the high voltage supply line 142 and the source of the drive transistor 152 can be connected to the light emitting device 154. The light emitting device 154 is connected between the drive transistor 152 and the low voltage supply line 144 ("Vss line"). For example, the light emitting device 154 can have an anode and cathode and the anode of the light emitting device 154 can be connected to the drive transistor 152 and the cathode of the light emitting device 154 can be connected to the low voltage supply line 144. The gate terminal of the drive transistor 152 is connected to a storage capacitor 156. The storage capacitor 156 is configured to apply a voltage to the gate of the drive transistor 152 so as to influence the conductance of the drive transistor 152 such that the current conveyed through the light emitting device 154 via the drive transistor 152 is controlled by the voltage on the storage capacitor 156. The storage capacitor 156 is shown connected to a ground voltage, but can alternatively be connected to the anode terminal of the light emitting device 154, one or the other of the supply voltage lines 142, 144, a reference voltage, and/or another stable voltage sufficient to allow the storage capacitor 154 to be charged according to programming information and apply a voltage to the drive transistor so as to influence the conductance of the drive transistor 152.

FIG. 1B also includes a diagram showing the voltage across the pixel circuit between the two voltage supply lines 142, 144. The total voltage difference between the voltage supply lines 142, 144 supplied via the adjustable voltage supply 140 is given by $Vdd^{supply} - Vss^{supply} = \Delta V$, or $DV_{TOTAL}$), where $Vdd^{supply}$ and $Vss^{supply}$ are the voltages output from the adjustable voltage supply on the supply lines 142, 144. At the pixel circuit, the voltages on the voltage supply lines 142, 144 are generally decreased/increased due to the resistive line losses between the adjustable voltage supply 140 and the pixel circuit being powered. Thus, the voltage on the Vdd line 142 at the pixel circuit shown in FIG. 1B is $Vdd^{supply} - (Vdd\ IR\ Drop)$. Similarly, the voltage on the Vss line 144 at the pixel circuit shown in FIG. 1B is $Vss^{supply} - (Vss\ IR\ Rise)$. The "IR Drop" and "IR Rise" refers to the voltages resulting from resistive line losses, where "I" refers to the current on the line and "R" refers to the line resistance. The voltage across the light emitting device (which can optionally be an OLED) is shown as $V_{OLED}$. The value of $V_{OLED}$ generally depends on the characteristics of the light emitting device 154, the aging history of the light emitting device 154, and/or the current being conveyed through the light emitting device 154. In some examples, the value of $V_{OLED}$ can increase with increasing drive current (i.e., increased luminance) and the increase can be compensated for by measuring and/or predicting the increase based on measurements from the monitoring system 115 or based on calibrated look-up tables stored in a memory 116 to map predicted aging degradation to usage histories/profiles.

The voltage across the drive transistor 152 is shown as $V_{DS}$, where $V_{DS}$ can refer to the "drain-source" voltage across the drive transistor 152. In some embodiments, the value of voltage across the transistor (e.g., the drain-source voltage $V_{DS}$) is sufficient to keep the drive transistor 152 in the saturation mode of operation, because at saturation the amount of current conveyed through a transistor is substantially independent of the voltage across the transistor. For example, the drive transistor 152 can operate in the saturation mode while $V_{DS} > V_{GS} - Vth$, where $V_{GS}$ is the voltage between gate and source terminals of the drive transistor 152 and Vth is the threshold voltage of the drive transistor 152. Thus, the value of VDS required to maintain the drive transistor 152 in saturation mode is dependent on the values of VGS and the threshold voltage, Vth. The value of Vth can change over time due to electrical degradation of the drive transistor 152. Similar to the discussion of $V_{OLED}$ above, the value of Vth can be compensated for over time according to measured and/or predicted values based on, for example, measurements via the monitoring system 115 and/or look-up tables stored in the memory 116 and mapped to usage profiles/histories. Where the value of $V_{DS}$ is greater than necessary to set the drive transistor 152 in the saturated mode, the excess voltage (i.e., the excess amount of $V_{DS}$ still applied across the drive transistor 152) is generally dissipated within the channel region of the drive transistor 152 as heat energy. In some examples, excessive heat generation in the channel region undesirably contributes to degradation of the drive transistor 152, and thus, the aging of the display system 100.

Thus, in some examples, the values of $Vdd^{supply}$ and/or $Vss^{supply}$ are selected to provide a voltage across the drive transistor 152 (e.g., the voltage $V_{DS}$) sufficient to set the drive transistor 152 in the saturated mode. The required value of $V_{DS}$ can be determined, at least in part, according to the measured and/or predicted values of Vdd IR Drop, Vss IR Rise, $V_{OLED}$, Vth. Additionally or alternatively, the required value of $V_{DS}$ can be determined, at least in part, according to the programming information for the pixel circuit, because the programming information influences the value of $V_{GS}$, because the luminance of the light emitting device 154 is generally related to the current through the drive transistor 152, and the current through the drive transistor 152 is regulated, at least in part, by $V_{GS}$. For example, the current through the drive transistor ("$I_{DS}$") can be set according to the relation $I_{DS} = \beta(V_{GS} - Vth)^2$, where $\beta$ is a variable characterizing the current-voltage behavior of the drive transistor 152, and can include gate oxide, aspect ratio, mobility, etc. of the drive transistor 152. Thus, the value of $V_{GS}$ is determined, at least in part, according to the luminance output from pixel circuit, and thus is determined, at least in part, according to the programming information for the pixel circuit.

In some embodiments of the present disclosure, the controller 130 analyzes the digital data indicating luminance values for the display to determine an amount to adjust the voltage on the first supply 142 and/or the second supply 144 such that the pixels in the display array will have sufficient power to produce the desired amount of luminance. In some embodiments, the controller 130 analyzes the digital data and/or measured, stored, and/or predicted degradation information for pixels in the display (such as values of $V_{OLED}$, Vth, etc.), and adjusts the voltage on the first supply line 142 and/or the second supply line 144 such that the pixels in the display array are each set in the saturated condition. In some examples, the controller 130 can analyze the incoming digital data to determine the required values of $\Delta V_{TOTAL}$ to set each pixel in the display system 100 in the saturated mode, and then the values of Vdd and/or Vss supplied via the adjustable voltage supply 140 can be set according to the maximum required value of $\Delta V_{TOTAL}$ in the display for each frame. By setting the value of DVTOTAL according to the maximum required value for each frame, rather than the maximum required value across all frames, the value of voltage across each pixel can be no greater than necessary on a frame-by-frame basis. Furthermore, because the pixels are all set in the saturated condition, there is generally no decrease in luminance, because the currents through the pixels are unaffected. Because the power through the display panel is set dependent on the product of voltage across each pixel and current through each pixel, decreasing the voltage also decreases power consumption (and also decreases heat generation within the drive transistor channel regions).

The controller 130 can be configured to advantageously calculate an optimum magnitude of the difference between Vdd and Vss ("$\Delta V$") such that the power consumed by the display system 100 is reduced as much as possible while still providing sufficient power to the pixels to produce the luminance values specified by the input data. The determination of the voltages to provide on the first supply line 142 and/or the second supply line 144 can be carried out in the controller 130 dynamically, such as on a frame-by-frame basis when the display system 100 is displaying video. The controller 130 can select a desired voltage to provide on the supply lines 142, 144 by analyzing the input data to determine, for example, the maximum luminance value to be emitted from the display. The controller 130 can also compute the total cumulative current to be drawn by all the pixels in the display to determine a total load placed on the adjustable voltage supply 140 during a particular frame.

The controller 130 selects desired voltages to be provided via the supply lines 142, 144 by using a formula and/or a look up table. The selection of the desired voltages can be accomplished by first calculating an optimal voltage (e.g., an optimal level of $\Delta V$). In some examples, the adjustable voltage supply 140 can be configured to provide output voltages at a series of predetermined voltage levels (e.g., a series of voltages separated by a resolution of the driver of the adjustable voltage supply 140). The controller 130 can optionally select the closest available value of $\Delta V_{TOTAL}$ by adjusting one or both of the supply lines 142, 144 to predetermined levels. In some examples, the controller 130 selects the predetermined levels of the supply lines 142, 144 to select the next highest value of $\Delta V_{TOTAL}$ over the determined optimal value. The selection of the desired voltage can also be accomplished by the controller 130 by determining, based on the digital input data, whether the total load to be drawn by the display and/or the maximum desired luminance value of the display are above or below a set of trigger values, or within a range specified by trigger values. The set of trigger values, or the ranges specified between the trigger values, can correspond to particular voltages provided by the adjustable voltage supply 140.

In the system 100, the supply lines 142, 144 providing supply voltages to the pixels in the display are coupled to the adjustable voltage supply 140. The individual supply lines coupled to the adjustable voltage supply 140 can be arranged along rows (or columns) of the display such that each supply line supplies a supply voltage to pixels in a common row (or column) of the display. Implementations can also provide for each supply line to be shared by pixels in adjacent rows (or columns) of the display.

In implementations of the display system 100 incorporating a monitoring system 115, the pixel 10 is also coupled to a monitor line 112. The monitor line 112 connects the pixel 10 to the monitor system 115. The monitor system 115 can be integrated with the data driver 110, or can be a separate stand-alone system. In particular, the monitoring system 115 can optionally be implemented by monitoring the current and/or voltage of the data line 114 during a monitoring operation of the pixel 10, and the monitor line 112 can be entirely omitted. Additionally, the display system 100 can be implemented without the monitoring system 115 or the monitor line 112. The monitor line 112 allows the monitoring system 115 to measure a current or voltage associated with the pixel 10 and thereby extract information indicative of a degradation of the pixel 10. For example, the monitoring system 115 can extract, via the monitor line 112, a current flowing through the drive transistor (e.g., the drive transistor 152) within the pixel 10 and thereby determine, based on the measured current and based on the voltages applied to the driving transistor during the measurement, a threshold voltage of the driving transistor or a shift thereof. The monitoring system 115 can also extract an operating voltage of the light emitting device (e.g., a voltage drop across the light emitting device while the light emitting device is operating to emit light, such as $V_{OLED}$ across the light emitting device 154). The monitoring system 115 can then communicate the signals 134 to the controller 130 and/or the memory 116 to allow the display system 100 to compensate for the extracted degradation information in subsequent programming and/or emission operations of the pixel 10. For example, once the degradation information is extracted, the programming information conveyed to the pixel 10 via the data line 114 can be appropriate adjusted during a subsequent programming and/or emission operation of the pixel 10 such that the pixel 10 emits light with a desired amount of luminance that is independent of the degradation of the pixel 10. It is specifically noted that implementations of the present disclosure can be realized with or without the monitoring system 115.

Figure 2:
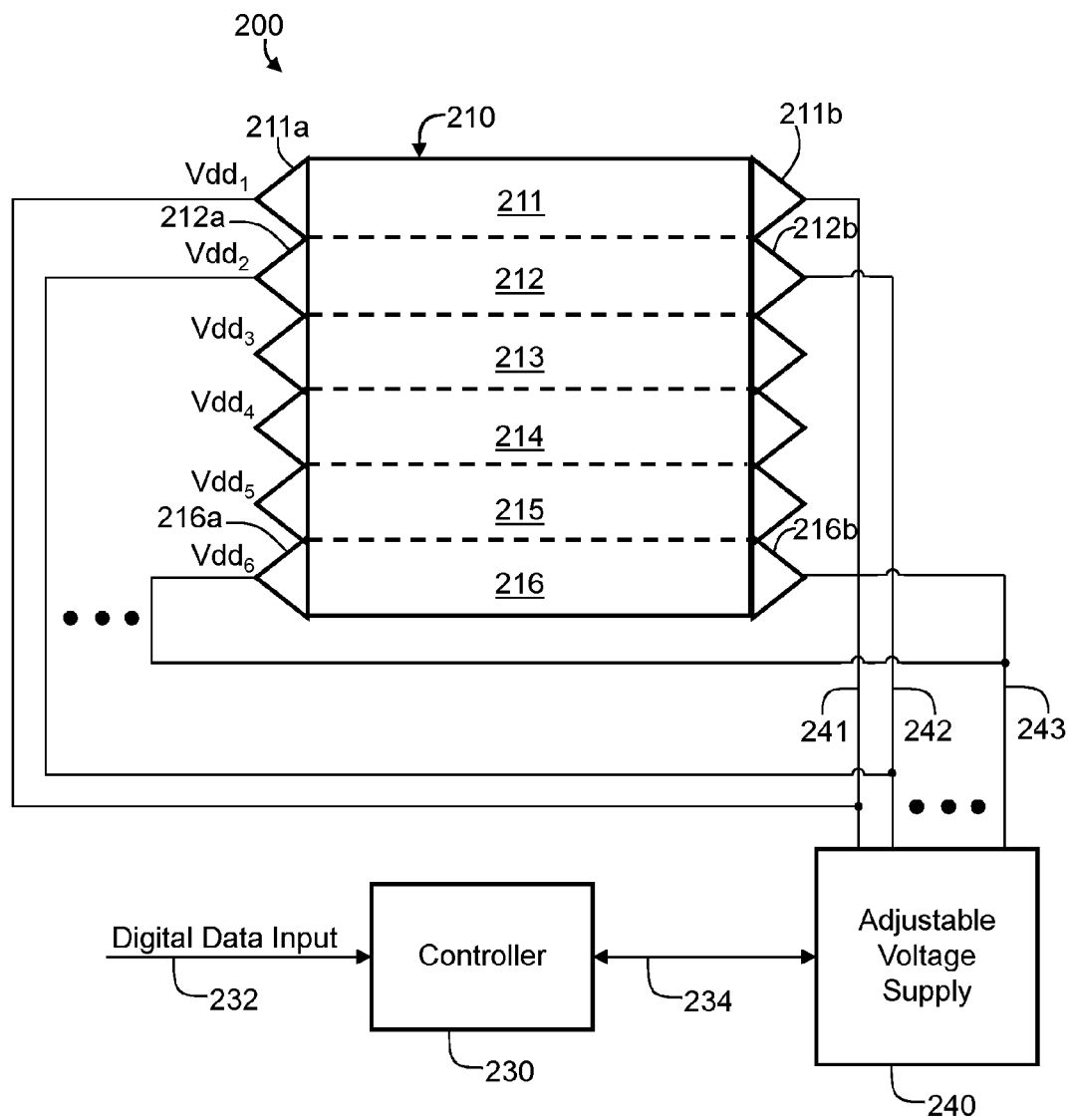
FIG. 2 is a diagram of a display system incorporating an adjustable voltage supply to separately adjust supply lines for a plurality of subsections of a display.

FIG. 2 is a diagram of a display system 200 incorporating an adjustable voltage supply 240 to separately adjust supply lines (e.g., the supply lines 241, 242) for a plurality of subsections (e.g., the subsections 211 to 216) of a display 210. The display system 200 also includes a controller 230 for receiving digital data 232 and for controlling the adjustable voltage supply 240 via control signals 234. Similar in some respects to the display described in connection with FIG. 1A, the display 210 generally includes an array of pixels that are individually programmable to emit light with individually programmable luminance values according to information indicated by the digital data 232. However, the display 210 differs from the display screen previously described in that the display 210 includes a plurality of discrete subsections. The display 210 includes a first subsection 211, a second subsection 212, a third subsection 213, a fourth subsection 214, a fifth subsection 215, and a sixth subsection 216. The subsections 211-216 can be supplied with supply voltages that are distinct from one another. For example, the first subsection 211 is supplied with the first supply voltage $Vdd_1$ via the first supply line 241; the second subsection 212 is supplied with the second supply voltage $Vdd_2$ via the second supply line 242; the sixth subsection 216 is supplied with the sixth supply voltage $Vdd_6$ via the sixth supply line 243. Similarly, while not separately illustrated, the remaining subsections 213-215 are supplied with respective, separately controllable supply voltages Vdd3, Vdd4, Vdd5 via respective supply lines for each subsection. The supply lines (e.g., the supply lines 241, 242, . . . , 243) corresponding to each subsection 211-216 are each coupled to the adjustable voltage supply 240 and to terminals connected to the respective subsections (e.g., the terminals 211a, 211b for the first subsection 211). The adjustable voltage supply 240 is configured to separately, and simultaneously, provide distinct supply voltages to the respective subsections 211-216.

The first supply line 241 and the second supply line 242 in FIG. 2 are related, but separate from, the pixel-level supply lines 142 and 144 illustrated in FIG. 1A. In particular, the first supply line 241 and the second supply line 242 are conductive lines that connect entire portions (i.e., subsections) of the display 210 to a supply voltage appropriate to the respective portion. The first display line 241 and the second display line 242 can each be electrically connected to a plurality of individual lines ("power rails"), akin to the supply lines 142 and 144 illustrated in FIG. 1, that are then connected to individual pixels within the respective subsections 211-216.

The connection between the first supply line 241 and the plurality of individual lines in the first subsection 211 is illustrated symbolically by the first terminal 211a and the second terminal 211b. The first terminal 211a provides a point of coupling between the plurality of power rails, or positive voltage supply lines, that are connected to the pixels in the first subsection 211. The second terminal 211b also provides a point of coupling between the plurality of power rails that are connected to the pixels in the first subsection 211, but from a side of the display 210 opposite a side having the first terminal 211a. By coupling the first supply line 241 to both terminals 211a, 211b, the pixels in the subsection 211 are advantageously less affected by variations in the supply voltage across the subsection 211. Thus, the effect of Vdd IR Drop discussed in connection with FIG. 1B can be less severe in the display system 200 than in other systems. However, the displays system 200 can be implemented with the power supply lines (e.g., the power supply lines 241, 242) connected to each respective subsection 211-216 via a single terminal (e.g., the first terminal 211a) rather than via two terminals. The remaining subsections 212 to 216 can be connected to the adjustable voltage supply 240 via terminals similar to the terminals 211a and 211b described for the first subsection 211. For example, the second supply voltage $Vdd_2$ can be delivered to power rails in the second subsection 212 via the terminals 212a, 212b; and the sixth supply voltage $Vdd_6$ can be delivered to power rails in the sixth subsection 216 via the terminals 216a, 216b.

In operation of the display system 200, the controller 230 is adapted to receive the digital data 232 and determine appropriate voltages to provide to each subsection 211-216 based on the digital data 232 (and optionally based on measured and/or predicted degradation information for the display). The controller 232 then sends the control signals 234 to the adjustable voltage supply 240 to instruct the adjustable voltage supply 240 to supply the appropriate voltages to the subsections 211-216. The controller 230 can determine the appropriate supply voltages for each subsection in a manner similar to the description of the operation of the controller 130 and the adjustable voltage supply 140 in connection with FIG. 1A, and can include calculating maximum luminance values for each subsection 211-216, total effective load for each subsection 211-216, and the use of threshold values and/or ranges to select an appropriate voltage. Additionally or alternatively, the control 230 can determine voltage levels required to set pixels in each subsection 211-216 in the saturated mode. In contrast to the display system 100 in FIG. 1A, the controller 230 in FIG. 2 can separately determine an appropriate voltage to be provided to each of the plurality of subsections 211-216. Furthermore, the determination of the appropriate voltage to provide to the subsections 211-216 can be carried out dynamically to adjust the supply voltages provided to the subsections of the display 210 in real time, and can be performed to adjust the supply voltage for each frame of a video signal. Implementations of the present disclosure also allow for adjusting the supply voltage provided to each subsection at a frequency less than the frame rate of a video signal. For example, the display system 200 can allow for the supply voltage provided to the subsection 211 to be fixed at the same level for two or more sequential frames of a video before being adjusted again.

The subsections 211-216 of the display 210 can also be referred to as regions or portions of the display. In some embodiments, the subsections 211-216 can be non-overlapping subsections. In the exemplary configuration illustrated in FIG. 2, the subsections 211-216 span the width of the display 210. However aspects of the present disclosure apply to displays having subsections that encompass less than the width of a display. In addition, aspects of the present disclosure apply to displays with subsections that are not regularly or evenly spaced. For example, subsections of a display may be arranged such that each subsection of the display corresponds to a region of the display that displays features of a graphical user interface. The separate subsections can be highlighted ("selected") according to user inputs to enable the user to, for example, navigate menus associated with the graphical user interface. By separately controlling the power of each subsection (e.g., the sections 211-216) in such a display, the voltage supplied to the subsections can be varied depending on whether the respective subsection is selected to be brightened or is deselected to be subdued. For example, and as described in connection with FIG. 5, for a display on a mobile device that is adapted to display emails, iconographic menu items, and the like, subsections of the display can be separately addressable to adjust the power drawn by highlighted ("selected") subsections of the display.

Additionally, while FIG. 2 is illustrated with reference to adjusting the positive supply voltage (i.e., $Vdd_1$, $Vdd_2$, etc.) to each subsection of the display 210, it is understood that the display system 200 can also be implemented while adjusting a negative supply voltage (such as supply voltages $Vss_1$, $Vss_2$, etc.) or by adjusting both a positive supply voltage and a negative supply voltage for each subsection 211-216 of the display 210.

Figure 3A:
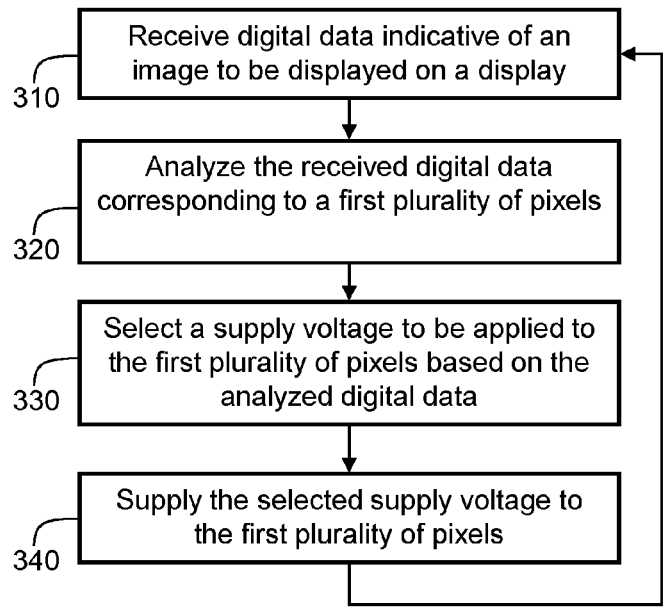
FIG. 3A illustrates a flow chart for an exemplary method of operating a display while decreasing the power consumption of the display.

FIG. 3A illustrates a flow chart for an exemplary method of operating a display while decreasing the power consumption of the display. The flow chart of FIG. 3A is described with reference to FIG. 2 for example purposes. The controller 230 receives the digital data 232 (310). The digital data 232 is indicative of an image to be displayed on the display 210. The controller 230 analyzes the received digital data 232 to corresponding to a first plurality of pixels (320). The first plurality of pixels can be, for example, the pixels in the subsection 211, or can be the pixels in the entirety of the display 210. The controller 230 then selects a supply voltage to be applied to the first plurality of pixels based on the analyzed digital data (330). As previously described, the selection of an appropriate supply voltage can be performed based on a range of the luminance values for the pixels in the display, on a maximum and/or minimum of such luminance values, on a voltage necessary to set the drive transistor in saturation mode, and/or based on a total anticipated cumulative load to be drawn to supply the desired luminance values, and can be carried out by using look up tables, threshold values, and/or formulas. The controller 230 then sends the control signals 234 to the adjustable voltage supply 240 such that the adjustable voltage supply 240 supplies the selected supply voltage to the first plurality of pixels (340).

Figure 3B:
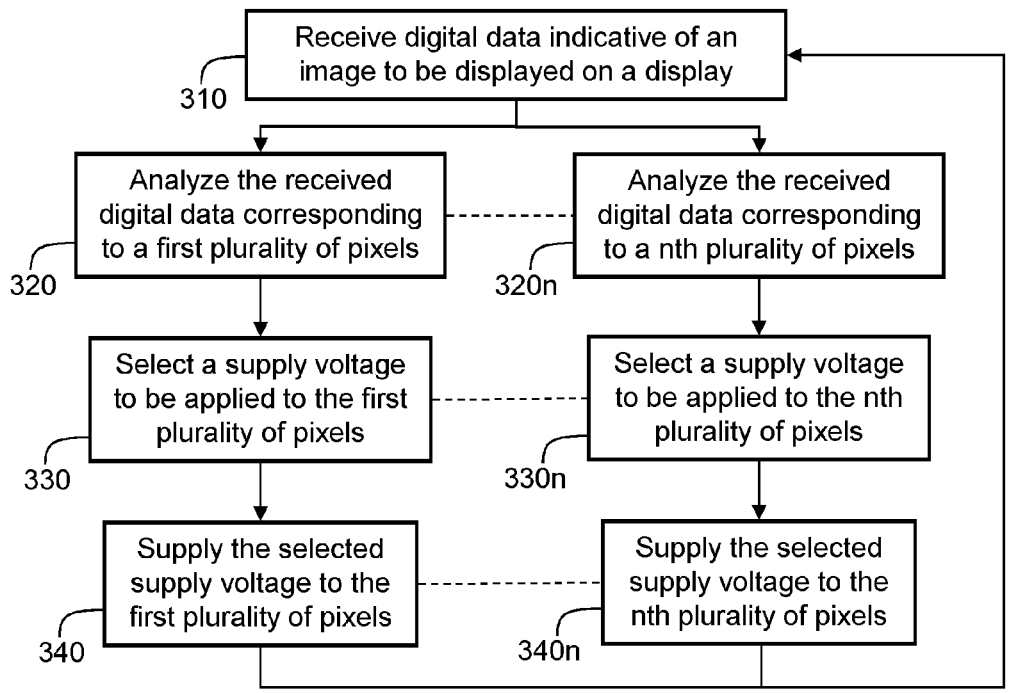
FIG. 3B illustrates a flow chart for another exemplary method of operating a display.

FIG. 3B illustrates a flow chart for another exemplary method of operating a display. The flow chart in FIG. 3B is similar to the flow chart of FIG. 3A except that the blocks 320, 330, and 340 are carried out for a plurality (n) of subsections of the display 210. Each of the subsections includes a plurality of pixels. Thus, in addition to analyzing the received digital data corresponding to the first plurality of pixels (320), the controller 230 also analyzes the received digital data corresponding to the additional pluralities of pixels according to the number of subsections in the display being operated. For example, with reference to the display 210 in FIG. 2, the received digital data is analyzed for the second through sixth subsections (212 to 216) in addition to the first subsection 211. For a generic display, the received digital data is thus analyzed for each subsection of the display through the "nth" plurality of pixels (320n). Similarly, a supply voltage is selected to be applied to each subsection of the display through the "nth" plurality of pixels (330n), and the respective selected supply voltages are supplied to each subsection in the display through the "nth" plurality of pixels (340n).

Figure 4:
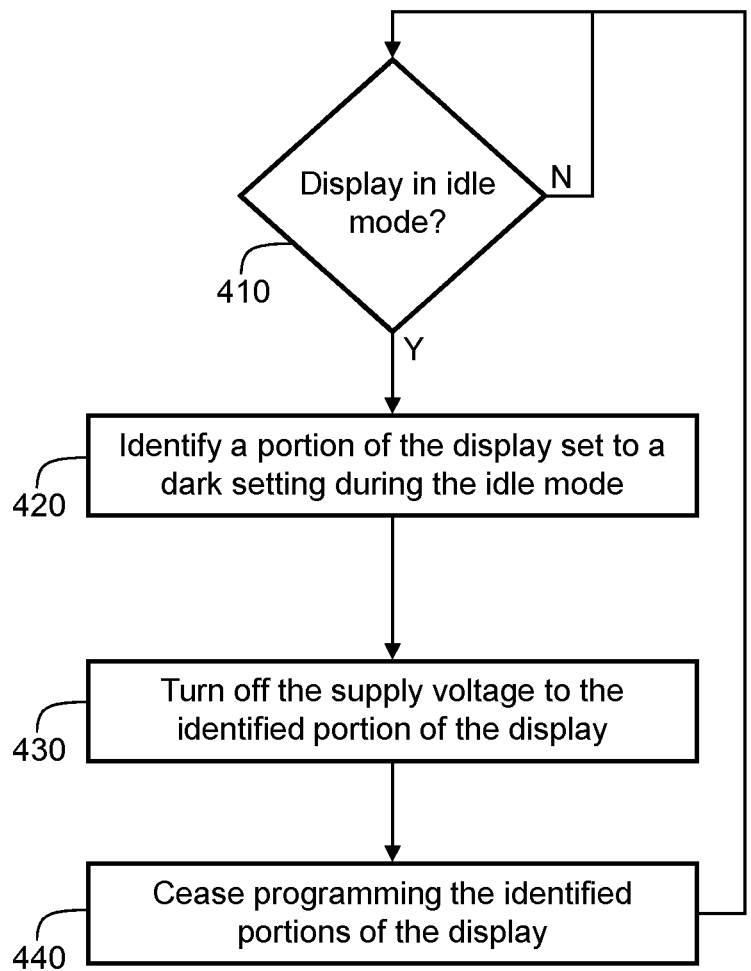
FIG. 4 illustrates a flowchart for another exemplary method of operating a display.

FIG. 4 illustrates a flowchart for another exemplary method of operating a display. It is determined whether the display is operating in an idle mode (410). If the display is operating in an idle mode, portions ("subsections") of the display are identified that are set to a dark setting during the idle mode (420). The supply voltage to the identified portions of the display are then turned off (430). Turning off the supply voltage to the identified portions of the display prevents current from being conveyed through pixels in the identified portions. In addition, the programming operation of the identified portions of the display can be ceased (440). Ceasing the programming operation in the identified portions advantageously prevents the display from drawing power during the programming operation. Without ceasing the programming operation, energy is generally expended during each frame to: address each row and provide programming voltages or programming currents via a data driver in order to charge a storage device within each pixel to a level that will prevent the drive transistor from turning on such that no light is emitted. In addition, for embodiments incorporating monitoring systems (such as the monitoring system 115 shown in FIG. 1A), the compensation and monitoring operation generally requires additional power to be drawn during monitoring and/or compensation operations of the display. In such implementations incorporating a monitoring system, the monitoring and compensation functions for the identified portions of the display that are set to a dark setting are advantageously ceased during the idle mode of the display. Once the programming, monitoring, and/or compensation operations are ceased for the identified portions of the display, an inquiry is made intermittently to check whether the display remains in the idle mode (410).

Figure 5:
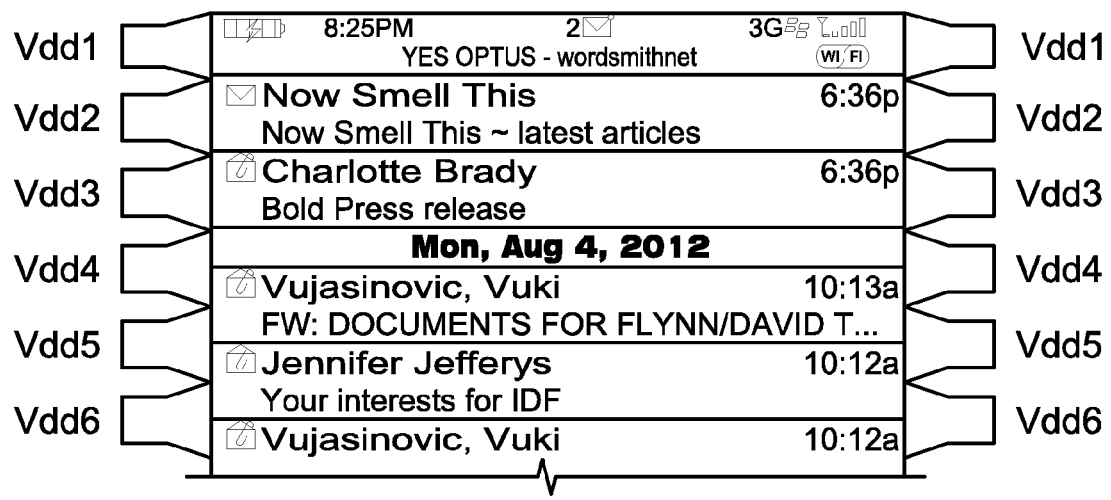
FIG. 5 illustrates an example screen capture of a display of a list of emails and incorporating selectable features.

FIG. 5 illustrates an example screen capture of a display of a list of emails and incorporating selectable features. On the example screen capture shown in FIG. 5, an email with the subject line "Now Smell This" is operated according to a second positive supply voltage Vdd2. For example, where the "Now Smell This" email was highlighted relative to other emails listed, such as to indicate a user selection, the voltage of Vdd2 can be adjusted relative to the other voltage values (e.g., the voltages Vdd3, Vdd4, Vdd5, Vdd6) such that the top email in the list can be shown highlighted relative to the other emails listed without wasting energy in the channel regions of the drive transistors in the pixel circuits of the other sections of the display. In addition, a header menu is separately controlled by the supply voltage Vdd1 such that the header menu can be shown bright (such as to indicate selection) while other sections of the display are shown subdued ("dimmed").

The screen capture in FIG. 5 illustrates a display system for a phone or other mobile device that has been segmented into subsections that have separately adjustable supply voltages. In some embodiments, the subsections coincide with regions on the graphical user interface that are separately highlighted (e.g., highlighted and/or dimmed) to allow a user to navigate the user interface (e.g., the list of emails). During the display of the list of emails shown by the screen capture in FIG. 5, Vdd2 can be set at a higher level than Vdd3-Vdd6 to allow the display in the subsection indicated by Vdd2 to be brighter than the other subsections of the display without unnecessarily wasting power in the dimmed regions.

Figure 6A:
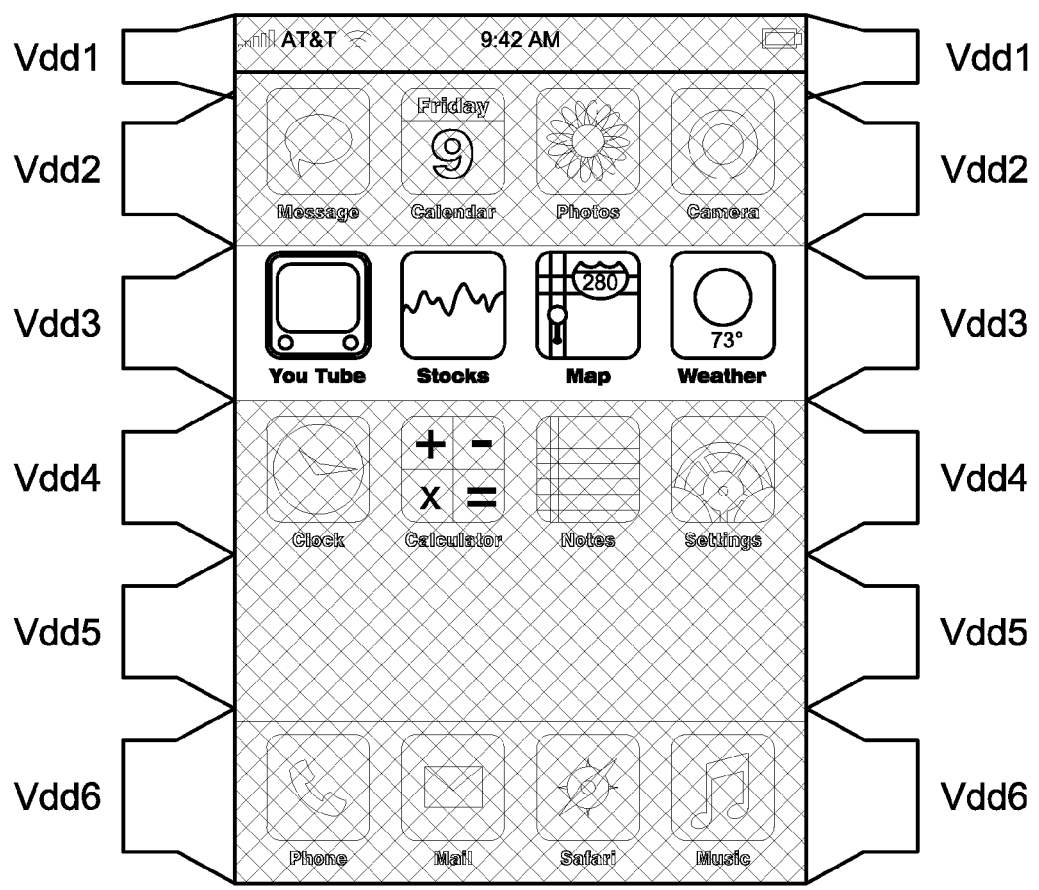
FIG. 6A is an example screen capture of a display menu with selectable features.
Figure 6B:
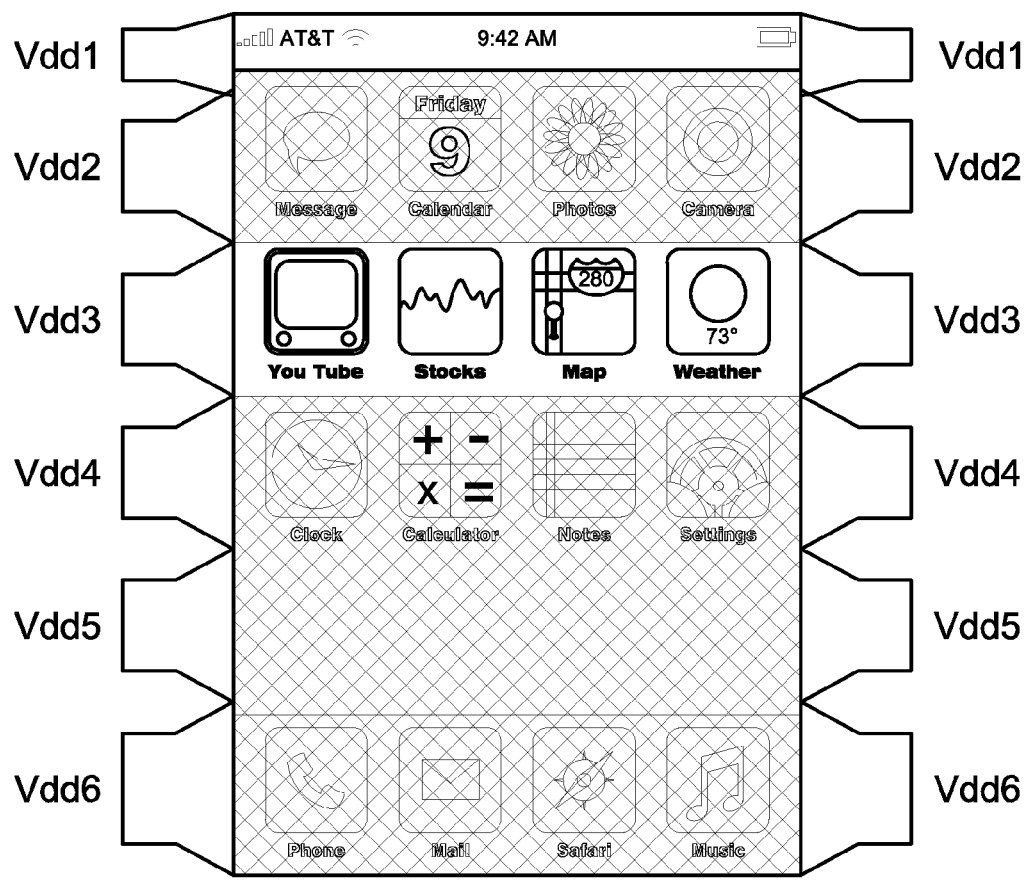
FIG. 6B is another example screen capture of the screen shown in FIG. 6A, but with an additional highlighted region shown.

FIG. 6A is an example screen capture of a display menu with selectable features. FIG. 6B is another example screen capture of the screen shown in FIG. 6A, but with an additional highlighted region shown. The screen capture in FIGS. 6A and 6B is another example display of a graphical user interface for a mobile device, such as a phone, PDA, or similar device. The graphical user interface illustrated in FIGS. 6A and 6B presents a menu of available programs and features on the device that is navigated according to user inputs provided by a user of the device. The various menu items on the display are indicated by iconographic symbols and are arranged in rows coinciding with the separately adjustable subsections of the display in FIGS. 6A and 6B. In particular, the subsection ("region") indicated by Vdd3 is highlighted relative to the adjacent subsections of the display. The icons in the highlighted subsection therefore appear brightened ("highlighted") relative to the icons in the adjacent subsections (e.g., the subsections indicated by Vdd2, Vdd4, Vdd5, Vdd6), which are subdued. In operation of the graphical user interface shown in FIGS. 6A and 6B, energy can be saved by decreasing the voltage supply (i.e., decreasing $\Delta V$) provided to the deselected subsections (e.g., the subsections indicated by Vdd2, Vdd4, Vdd5, Vdd6).

In addition, in comparing the screen shots in FIGS. 6A and 6B, the screen shot in FIG. 6B shows the header bar in the region indicated by Vdd1 in a highlighted state. By contrast, the header bar is in a subdued/dimmed state in FIG. 6A. It should be noted that the header bar in FIGS. 6A and 6B is of a different size than the other subsections of the display, such as the subsection indicated by Vdd2, and the size of the segmented subsections of the display are selected to correspond to the brightness-variable regions of the user interface shown on the display. Thus, in some embodiments of the present disclosure display panels with segmented adjustable power supply regions are designed to have sizes and/or shapes of distinct adjustable regions correspond to sizes and/or shapes of a user interface to be operated on the display.

To enable the highlighting of the header bar as shown in FIG. 6B, the magnitude of Vdd1, and thus the magnitude of $\Delta V$, can be increased relative to the value of Vdd1 in FIG. 6A. In other words, to save energy while the header bar is not highlighted, the magnitude of Vdd1 can be decreased relative to the value of Vdd1 when the header bar is highlighted. Advantageously, saving energy in the operation of the displays shown in FIGS. 5 through 6B allows the device to operate for a longer duration from a given battery charge. Furthermore, decreasing the amount of energy converted to heat energy in the channel regions of the dimmed regions of the display extends the lifetime of the display panel by decreasing the electrical degradation of the drive transistors within the pixels of the display.

Figure 7:
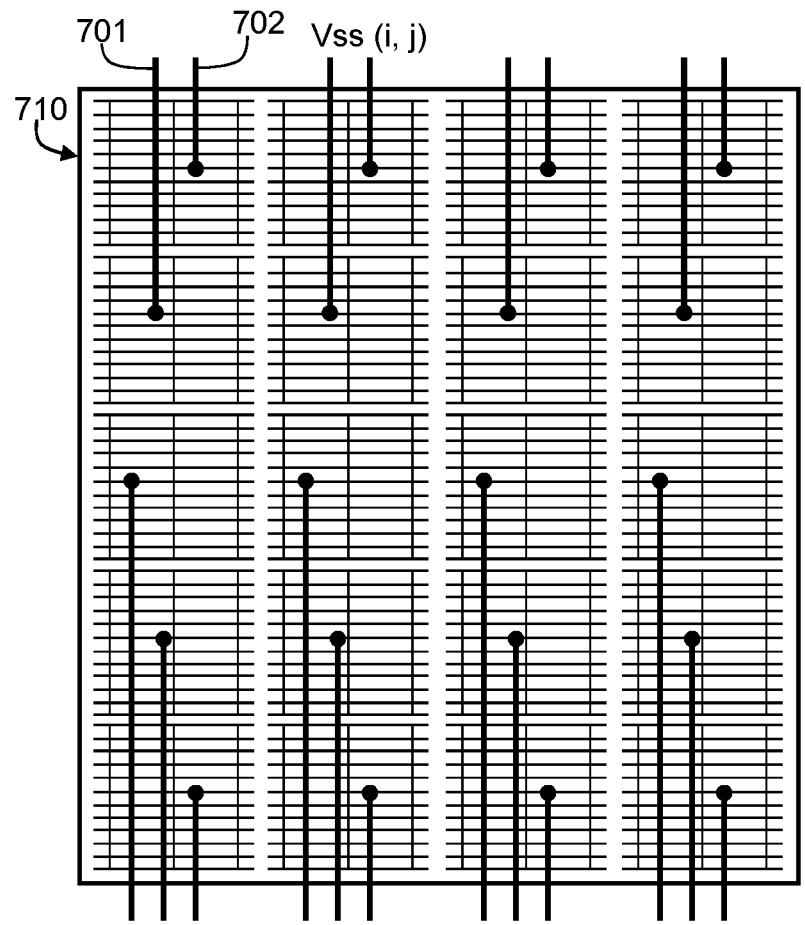
FIG. 7 illustrates an example configuration for electrode patterning of a display array where supply lines are separately adjustable.

FIG. 7 illustrates an example configuration for electrode patterning of a display array 710 where supply lines are separately adjustable. The display array 710 includes a plurality of subsections arranged in a grid. Each of the subsections are separately controllable by supply lines (e.g., the supply lines 701, 702) which connect to an adjustable voltage supply. The display array 710 illustrated in FIG. 7 has a fixed positive voltage supply Vdd (not shown) and the negative voltages supply Vss(i, j) is separately controllable ("addressable") via the plurality of supply lines that are provided for each subsection in a one to one ratio. In some embodiments of the present disclosure, the supply lines for the array of Vss(i, j) regions can be considered a passive power supply matrix of the display 710. That is, by controlling the magnitude of Vss(i, j), each subsection in the grid of subsections can be dynamically supplied with a selected value of $\Delta V$ which is appropriate to the respective subsection based on the luminance values desired for the respective subsection as indicated by a digital data input.

Figure 8:
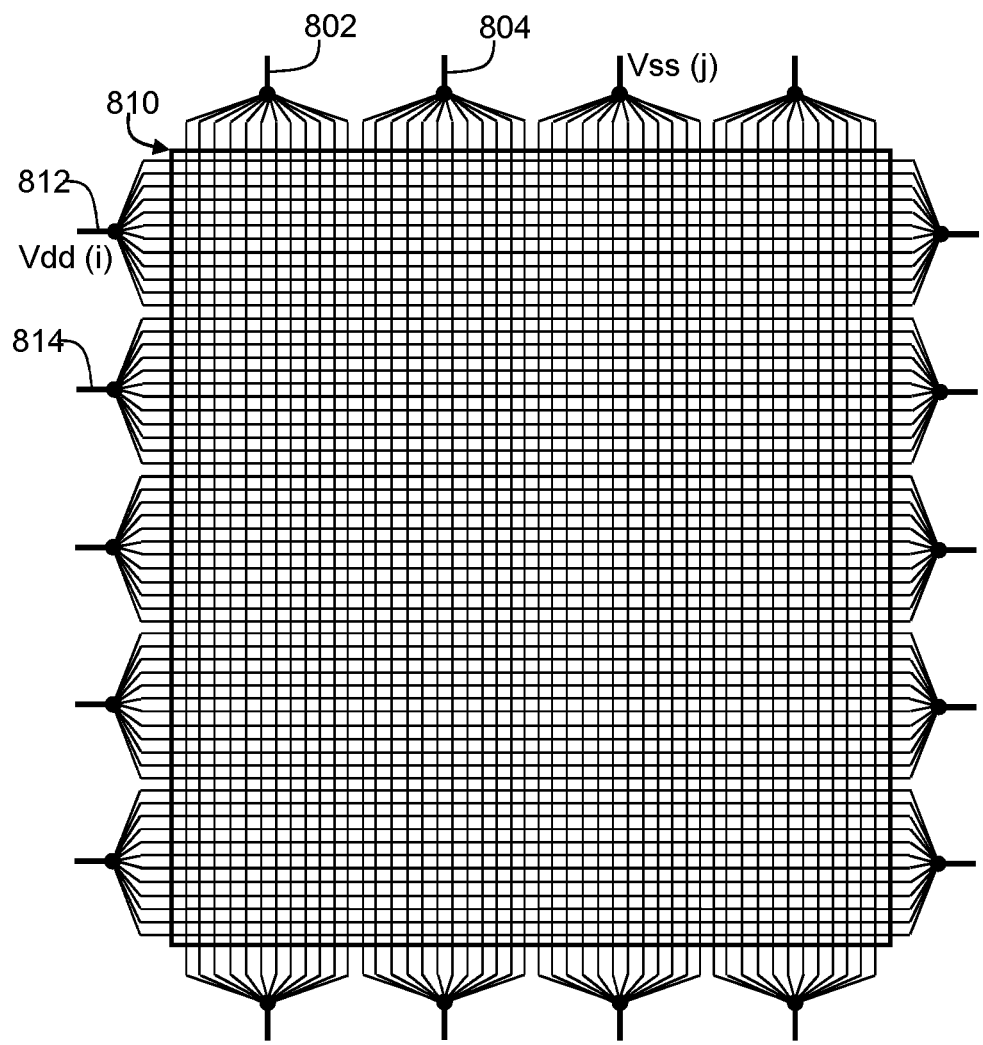
FIG. 8 illustrates another example configuration for a pattern of electrodes in a display array where supply lines are separately adjustable.

FIG. 8 illustrates another example configuration for a pattern of electrodes in a display array 810 where supply lines are separately adjustable. The display array 810 also includes a plurality of subsections arranged in a grid. In the configuration of the display array 810, the positive supply voltage Vdd(i) is separately controllable along the rows of the grid formed by the plurality of subsections, and the negative supply voltage Vss(j) is separately controllable along the columns of the grid formed by the plurality of subsections. By adjusting Vss(j) via the column terminal connectors (e.g., the connectors 802, 804, etc.) and Vdd(i) the row terminal connectors (e.g., the connectors 812, 814, etc.), the ΔV applied to each subsection in the grid of subsections is separately adjustable. The column terminal connectors and the row terminal connectors are connected to an adjustable voltage supply and are dynamically set to appropriate voltages according the systems and methods described herein. In some embodiments, the first power supply lines (e.g., the power rails set to Vdd(i)) can be situated generally on one side of a display substrate, running horizontally, while the second power supply lines (e.g., the power rails set to Vss(j)) can be situated over the pixel circuits and/or on an encapsulation substrate, running vertically, such that the pixel circuits in the display panel 810 are deposited between the Vdd and Vss power rails.

In some embodiments, the sizes and arrangements of the subsections of the display arrays are selected to correspond to portions of a display that are selectively highlighted according to a graphical user interface. For example, the selectable features shown in FIGS. 6A and 6B (i.e., the iconographic menu items) can be dimensioned so as to coincide with separately adjustable subsections of a display that displays the graphical user interface.

Systems utilizing the above described methods to dynamically adjust the supply voltages supplied to a display can decrease the power consumed by such a display device by a substantial factor relative to conventional devices utilizing fixed supply voltage lines. Energy savings can be roughly 20% compared to conventional systems.

Two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example determination methods and processes described herein may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), field programmable gate array (FPGA), discrete logic, etc.). For example, any or all of the components of the baseline data determination methods could be implemented by software, hardware, and/or firmware. Also, some or all of the machine readable instructions represented may be implemented manually.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for driving a display, the system comprising:
an array of pixel circuits that includes a plurality of subsections arranged in a grid, each of said pixel circuits comprising a light emitting device and a driving transistor for conveying a driving current through the light emitting device;
a first plurality of pairs of supply lines providing driving currents to said pixel circuits, at least one of each of said pairs of supply lines being coupled to all the pixel circuits in one of said subsections;
multiple adjustable voltage supplies configured to provide an adjustable supply voltage to at least each of said supply lines that are coupled to all the pixel circuits in one of said subsections;
a controller for determining, based on digital data indicative of an amount of luminance to be emitted from the pixel circuits in each of said subsections, an output level sufficient to enable the pixel circuits in each of said subsections to emit light according to the digital data.

2. The system according to claim 1, wherein the controller is configured to dynamically determine, based on a range of luminance values indicated by the digital data for the first plurality of pixel circuits, a voltage level to apply to the first plurality of pixel circuits sufficient to set the driving transistors in the first plurality of pixel circuits in a saturation mode.

3. The system according to claim 2, the controller being further configured to select one of a plurality of supply voltages the adjustable voltage supply is configured to provide, based on the determined voltage level for the first plurality of pixel circuits, the adjustable voltage supply being configured to supply the selected one of the plurality of supply voltages to the at least one of the first plurality of supply lines responsive to the selection.

4. The system according to claim 1, wherein the controller is further configured to calculate a magnitude of a desired supply voltage based on a range of luminance values indicated by the digital data for the first plurality of pixel circuits, the magnitude of the desired supply voltage being sufficient to enable the first plurality of pixel circuits to emit light according to the luminance values indicated by the digital data.

5. The system according to claim 1, wherein the system is configured to dynamically adjust the adjustable voltage supply to provide a desired supply voltage via the at least one of the plurality of supply lines in real time.

6. The system according to claim 1, wherein the system is configured to dynamically adjust the adjustable voltage supply to provide a desired supply voltage via the at least one of the plurality of supply lines based on both predicted or measured degradation information for the display and the digital data indicative of luminance.

7. A system for driving a display, the system comprising:
a first plurality of pixel circuits arranged in an array, each of the first plurality of pixel circuits comprising a light emitting device and a driving transistor for conveying a driving current through the light emitting device;
a first plurality of supply lines each associated with one or more of the first plurality of pixel circuits, the first plurality of supply lines providing driving currents to the one or more of the first plurality of pixel circuits associated therewith;
an adjustable voltage supply configured to provide a supply voltage to at least one of the first plurality of supply lines;
a controller for determining, based on digital data indicative of an amount of luminance to be emitted from the first plurality of pixel circuits, an output level from the adjustable voltage supply to apply to the at least one of the first plurality of supply lines, the output level being sufficient to enable the one or more of the first plurality of pixel circuits associated with the at least one of the first plurality of supply lines to emit light according to the digital data; and a graphical user interface having features that are interactively highlighted to be alternately brightened or dimmed according to inputs provided by a user for selecting and deselecting the features, the features being positioned on distinct portions of the display, the distinct portions of the display each being associated with a respective plurality of supply lines providing respective supply voltages that are separately adjustable by the adjustable voltage supply.

8. The system according to claim 7, wherein the controller is further configured to determine the supply voltages provided to the distinct portions of the display according to digital data indicative of the amount of luminance to be emitted by pixels in each of the distinct portions of the display.

9. The system according to claim 7, wherein the distinct portions of the display are non-overlapping.

10. The system according to claim 7, wherein the display is a mobile device display and the features comprise icons on a menu for selecting programs operating on the mobile device.

11. The system according to claim 10, wherein the mobile device is a phone.

12. The system according to claim 1, wherein the light emitting device in each of the plurality of pixel circuits is an organic light emitting diode and wherein the driving transistor in each of the plurality of pixel circuits is an n-type or p-type thin film transistor.

13. A method of operating a display, the method comprising:

receiving digital data input indicative of an amount of luminance to be emitted from an array of pixel circuits that includes a plurality of subsections arranged in a grid, each of said pixel circuits comprising a light emitting device and a driving transistor for conveying a driving current through the light emitting device;

providing driving currents to said pixel circuits from a first plurality of pairs of supply lines, at least one of each of said pairs of supply lines being coupled to all the pixel circuits in one of said subsections;

determining, based on the received digital data, one of a plurality of supply voltages to apply to each of said first plurality of pairs of supply lines;

providing an adjustable supply voltage to at least each of said supply lines that are coupled to all the pixel circuits in one of said subsections;

determining, based on digital data indicative of an amount of luminance to be emitted from the pixel circuits in each of said subsections, an output level-in each of said subsections to emit light according to the digital data; and adjusting a voltage of one or more supply voltage lines associated with the first plurality of pixels according to the determined one of the plurality of supply voltages.

14. The method of claim 13, further comprising:

determining, based on the received digital data, voltages necessary to set driving transistors in each of the first plurality of pixels in a saturation mode;

analyzing the determined necessary voltages to find the maximum necessary voltage; and setting the adjustable voltage supply to provide the maximum necessary voltage to the first plurality of pixels.

15. The method according to claim 13, further comprising:

determining a magnitude of a supply voltage to be applied to a first portion of the display sufficient to set driving transistors in the first portion in a saturation mode.

16. The method according to claim 13, wherein the determining includes:

evaluating the voltages required in each pixel to operate emissive elements according to measured or predicted aging information for each pixel.

* * * * *